(12) United States Patent
Ince et al.

(10) Patent No.: US 10,415,655 B2
(45) Date of Patent: *Sep. 17, 2019

(54) WEDGE CLUTCH HAVING A PLURALITY OF WEDGES AND WEDGE CLUTCH WITH WEDGE PLATES AND SELF-LOCKING DISPLACEMENT ASSEMBLY

(71) Applicant: Schaeffler Technologies AG & Co. KG, Herzogenaurach (DE)

(72) Inventors: Marion Jack Ince, Mount Holly, NC (US); Guihui Zhong, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 481 days.

This patent is subject to a terminal disclaimer.

(21) Appl. No.: 15/274,700

(22) Filed: Sep. 23, 2016

(65) Prior Publication Data
US 2017/0227065 A1 Aug. 10, 2017

Related U.S. Application Data

(63) Continuation-in-part of application No. 15/019,556, filed on Feb. 9, 2016, now Pat. No. 9,989,104.

(51) Int. Cl.
*F16D 15/00* (2006.01)
*F16D 13/06* (2006.01)
*F16D 41/063* (2006.01)
*F16D 23/12* (2006.01)
*F16D 13/16* (2006.01)

(52) U.S. Cl.
CPC ............. *F16D 15/00* (2013.01); *F16D 13/06* (2013.01); *F16D 13/16* (2013.01); *F16D 23/12* (2013.01); *F16D 41/063* (2013.01)

(58) Field of Classification Search
CPC .......... F16D 13/04; F16D 13/16; F16D 15/00; F16D 23/12; F16D 2023/123; F16D 13/06; F16D 41/063
See application file for complete search history.

(56) References Cited

U.S. PATENT DOCUMENTS

| 3,640,365 | A  | * | 2/1972 | Henry | F16D 43/18 |
|---|---|---|---|---|---|
|  |  |  |  |  | 192/105 BA |
| 4,494,636 | A  | * | 1/1985 | Wakabayashi | F16D 41/07 |
|  |  |  |  |  | 192/41 A |
| 9,702,415 | B1 | * | 7/2017 | Ince | F16D 15/00 |
| 9,989,104 | B2 | * | 6/2018 | Ince | F16D 13/16 |
| 2014/0110207 | A1 |  | 4/2014 | Davis |  |
| 2015/0083539 | A1 |  | 3/2015 | Lee et al. |  |

OTHER PUBLICATIONS

U.S. Appl. No. 14/994,505, filed Jan. 13, 2016 and titled Wedge Clutch With Mutually Supporting Wedge Plates (Unpublished).
PCT Patent Application No. PCT/US2015/055746, filed on Oct. 15, 2015 and titled Clutch With Wedge Slate Segments (Unpublished).

* cited by examiner

*Primary Examiner* — Richard M Lorence
(74) *Attorney, Agent, or Firm* — Reid A. Baldwin (57) ABSTRACT

A wedge plate for a wedge clutch assembly for selectively engaging or disengaging an inner hub and an outer ring including first wedge plate segments arranged radially between the inner hub and outer ring, each of the first wedge plate segments including a first circumferentially extending groove and a first retaining element disposed in the first circumferentially extending groove and urging the first wedge plate segments radially inward to contact the inner hub.

19 Claims, 8 Drawing Sheets

Fig. 8D

WEDGE CLUTCH HAVING A PLURALITY OF WEDGES AND WEDGE CLUTCH WITH WEDGE PLATES AND SELF-LOCKING DISPLACEMENT ASSEMBLY

CROSS-REFERENCE TO RELATED APPLICATIONS

This application is a continuation-in-part patent application filed under 35 U.S.C. § 120 of application Ser. No. 15/019,556, filed on Feb. 9, 2016, which application is hereby incorporated herein by reference in its entirety.

TECHNICAL FIELD

The present disclosure relates generally to a wedge clutch having a plurality of wedges and a wedge clutch having a plurality of wedges and a self-locking displacement assembly. In particular, the assembly is able to maintain the wedge clutch in a connect (closed) mode without the application of external force, for example, by an actuator.

BACKGROUND

Known wedge clutches typically include at least one resilient wedge plate which is biased radially inward and arranged to expand circumferentially and radially to frictionally contact an outer ring. Unfortunately, non-retained wedge plates are prone to fatiguing. Moreover, when the outermost surface of the wedge plate frictionally contacts the outer ring and torque is transmitted through the clutch, the frictional contact can be disrupted due to the flexibility of the wedge plate. When torque is being transmitted, the resiliency of the wedge plate causes an axial deflection of the wedge plate. Although surface contact is desired, due to the axial deflection, the wedge plate frictionally contacts the outer ring along an edge of the wedge plate instead. Unfortunately, such wedge clutches exhibit reduced reliability and torque-carrying capacity. Additionally, for wedge clutches including an inner hub having lobes for contacting the wedge plate, alternating contact points between the hub lobes and the wedge plate cause an inconsistent expansion of the wedge plate.

SUMMARY

According to aspects illustrated herein, there is provided a wedge plate for a wedge clutch assembly for selectively engaging or disengaging an inner hub and an outer ring including first wedge plate segments arranged radially between the inner hub and outer ring, each of the first wedge plate segments including a first circumferentially extending groove and a first retaining element disposed in the first circumferentially extending groove and urging the first wedge plate segments radially inward to contact the inner hub.

According to aspects illustrated herein, there is provided a wedge clutch assembly for selectively engaging or disengaging an inner hub and an outer ring including first wedge plate segments arranged radially between the inner hub and outer ring, each of the first wedge plate segments including first and second circumferentially extending grooves and a first plurality of ramps, first and second retaining elements disposed respectively in the first and second circumferentially extending grooves and urging the first wedge plate segments radially to contact the inner or outer hub, and a second plurality of ramps engaged with the first plurality of ramps.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

By "non-rotatably engaged" elements, we mean that: the elements are engaged so that whenever one of the elements rotate, all the elements rotate, and relative rotation between the elements is not possible. Radial and/or axial movement of non-rotatably engaged elements with respect to each other is possible, but not required.

Figure 1:
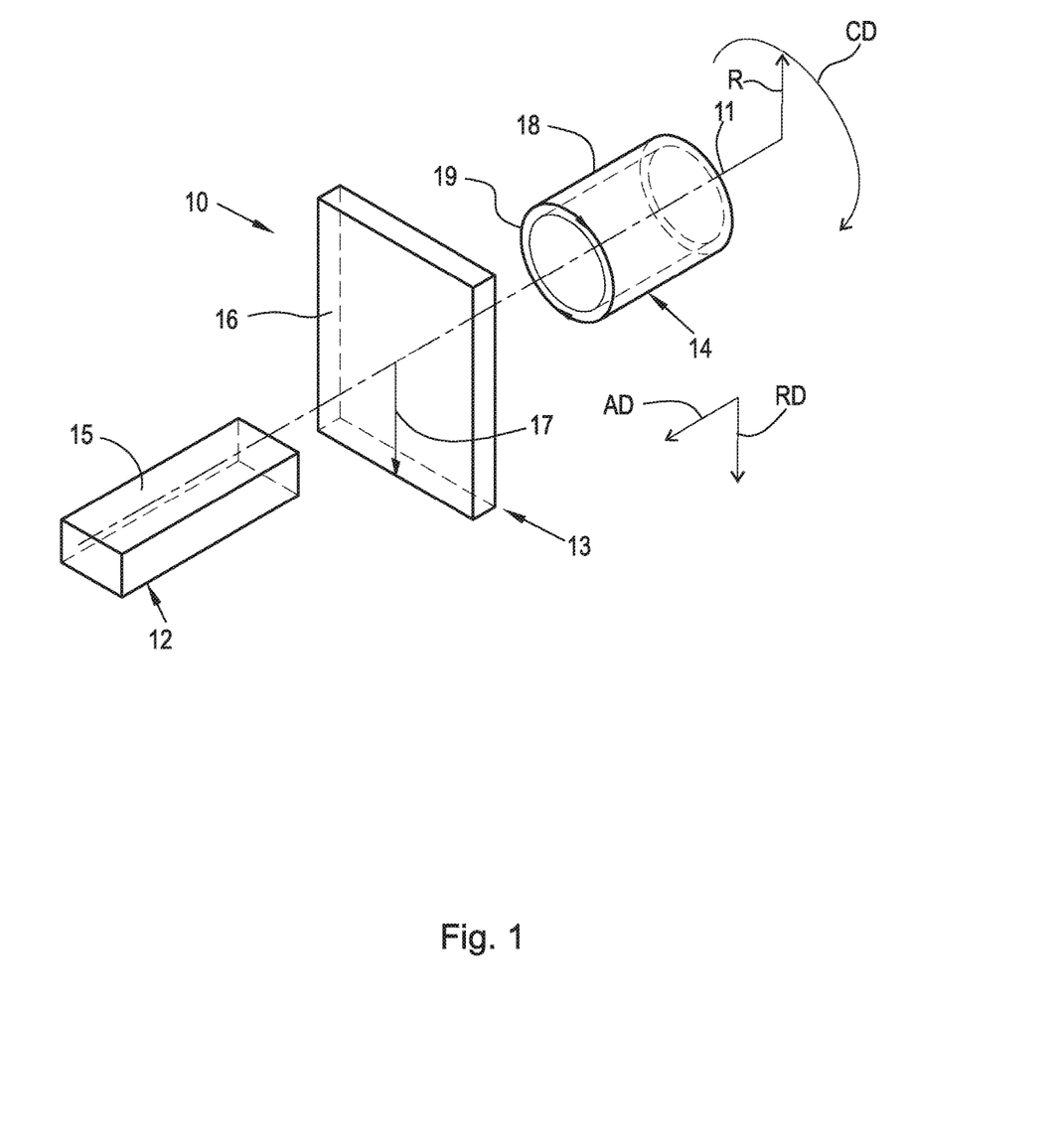
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11. Rotational direction is designated by the reference variable "RD" and a number. For example, RD1 refers to the direction of rotation about axis 11.

Objects 12, 13, and 14 are used to clarify the spatial terminology. An axial surface, such as surface 15 of object 12, is formed by a plane co-planar with axis 11. Axis 11 passes through planar surface 15, however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16, however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
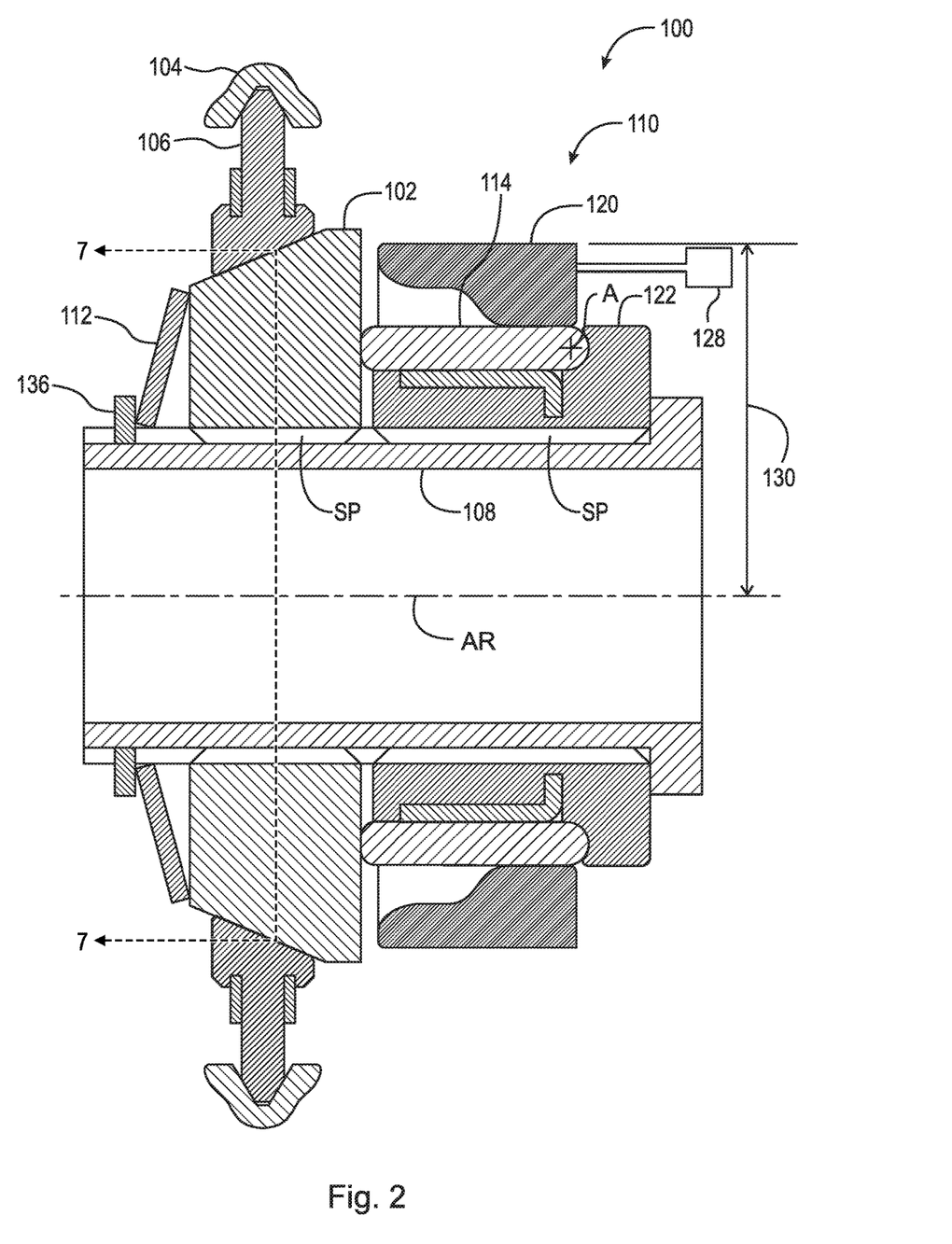
FIG. 2 is a cross-sectional view of a wedge clutch with a self-locking connect mode, in a connect mode.

FIG. 2 is a cross-sectional view of wedge clutch 100 with a self-locking connect mode, in the connect mode.

Figure 3:
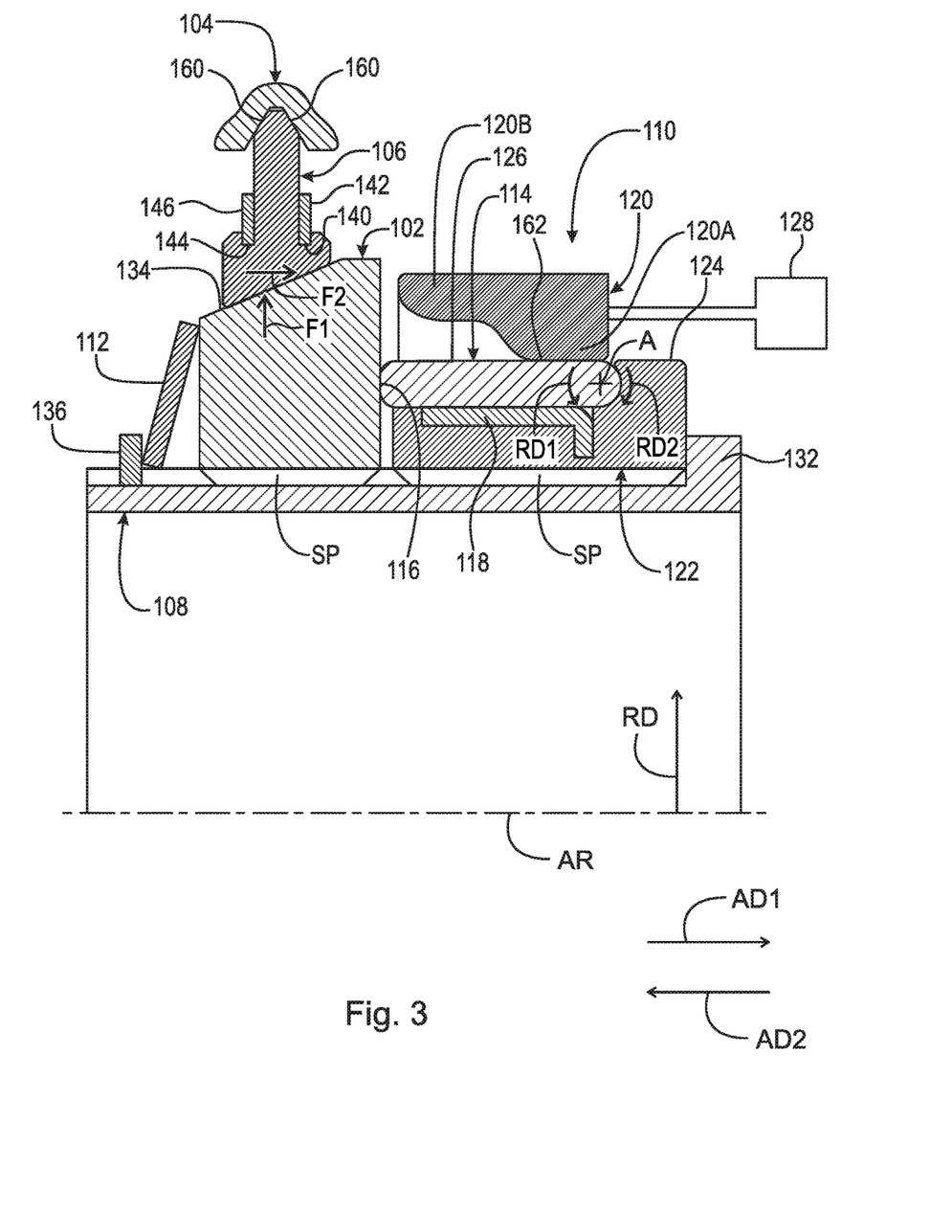
FIG. 3 is a partial cross-sectional view of the wedge clutch in FIG. 2.

FIG. 3 is a partial cross-sectional view of wedge clutch 100 in FIG. 2. The following should be viewed in light of FIGS. 2 and 3. Wedge clutch 100 includes: axis of rotation AR, hub 102, outer ring 104 located radially outward of hub 102, wedge plate 106, splined shaft 108, and displacement assembly 110. Wedge plate 106 is radially disposed between inner hub 102 and outer ring 104. In an example embodiment, assembly 110 includes element 112 urging hub 102 in axial direction AD1. In an example embodiment, element 112 is a resilient element. Assembly 110 includes engagement arm 114. Hub 102 and at least portions of assembly 110 are non-rotatably connected to shaft 108, for example, by splines SP. By "non-rotatably connected" elements, we mean that: the elements are connected so that whenever one of the elements rotate, all the elements rotate, and relative rotation between the elements is not possible. Radial and/or axial movement of non-rotatably connected elements with respect to each other is possible, but not required.

Figure 4:
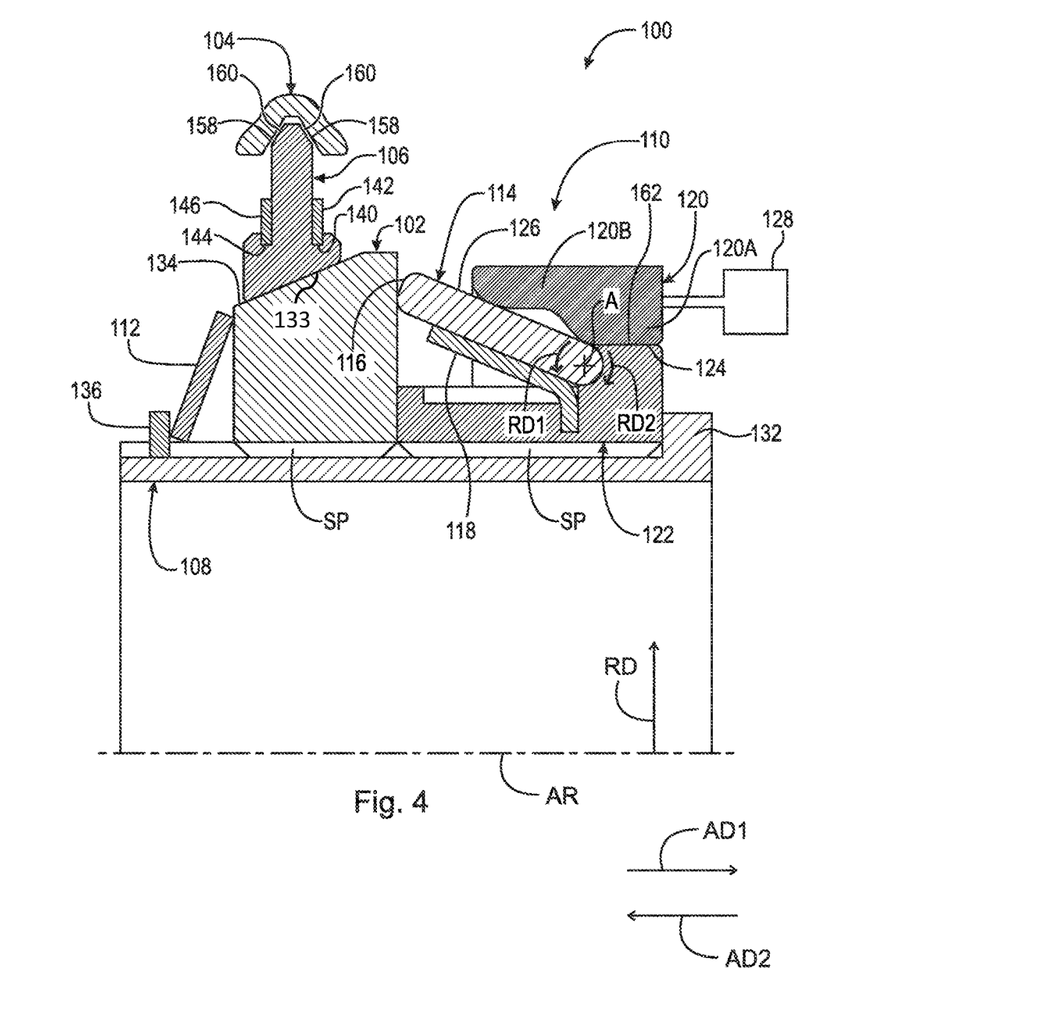
FIG. 4 is a partial cross-sectional view of the wedge clutch in FIG. 2, in a disconnect mode.

FIG. 4 is a partial cross-sectional view of wedge clutch 100 in FIG. 2, in a disconnect mode. The following should be viewed in light of FIGS. 2 through 4. To transition from a disconnect mode for wedge clutch 100, in which hub 102 and outer ring 104 are rotatable with respect to each other, to a connect mode for wedge clutch 100, in which hub 102 and ring 104 are non-rotatably connected, engagement arm 114 is arranged to pivot, with respect to axis A for engagement arm 114, in rotational direction RD1 to displace hub 102 in axial direction AD2, opposite axial direction AD1. To transition from the connect mode to the disconnect mode: engagement arm 114 is arranged to pivot, with respect to axis A, in rotational direction RD2, opposite rotational direction RD1, and element 112 is arranged to displace hub 102, with respect to plate 106 and shaft 108, in axial direction AD1.

Engagement arm 114 includes distal end 116 directly engaged with, for example, in contact with, hub 102. To transition from the disconnect mode to the connect mode, engagement arm 114 is arranged to pivot, or rotate (hereinafter, the terms "pivot" and "rotate" are used interchangeably), distal end 116 in rotational direction RD1, toward axis of rotation AR. To transition from the connect mode to the disconnect mode, engagement arm 114 is arranged to pivot distal end 116 in rotational direction RD2, away from axis of rotation AR.

In an example embodiment, assembly 110 includes: arm spring 118 urging arm 114 in rotational direction RD2, and slider ring 120 in contact with engagement arm 114. To transition from the disconnect mode to the connect mode, slider ring 120 is arranged to: slide along engagement arm 114 in axial direction AD2, and pivot engagement arm 114 in rotational direction RD1. Thus, engagement arm 114 is in compressive engagement with slider ring 120. To transition from the connect mode to the disconnect mode, slider ring 120 is arranged to: slide along engagement arm 114 in axial direction AD1, and arm spring 118 is arranged to pivot arm 114 in rotational direction RD2.

In an example embodiment, displacement assembly 110 includes support block 122 and engagement arm 114 is pivotably connected to support block 122. For example, axis A passes through block 122. Block 122 is non-rotatably connected to shaft 108. Arm spring 118 reacts against support block 122 to urge arm 114 in rotational direction RD2. Slider ring 120 is radially outward of support block 122. To transition between the connect mode and the disconnect mode, inner surface 162 of slider ring 120 is arranged to slide along support block 122, for example, along surface 124 of support block 122 and along engagement arm 114, for example, along surface 126. Once in the connect mode, contact between arm 114 and slider ring 120 prevents arm 114 from rotating in rotational direction RD2; thus, keeping wedge clutch 100 in the connect mode.

In an example embodiment, to transition from the disconnect mode to the connect mode, slider ring 120 is arranged to: slide along engagement arm 114 in axial direction AD2, for example, along surface 126 of arm 114, and engagement arm 114 is pivoted in rotational direction RD1 by arm spring 118. In an example embodiment, to transition from the connect mode to the disconnect mode: slider ring 120 is arranged to slide along engagement arm 114 in axial direction AD1, for example, along surface 126, and arm spring 118 is arranged to pivot engagement arm 114 in rotational direction RD2.

In an example embodiment, slider ring 120 includes portion 120A and portion 120B. Portion 120B is radially outward of portion 120A. In the disconnect mode, portions 120A and 120B are in contact with engagement arm 114. In an example embodiment, in the connect mode, engagement arm 114 is free of contact with portion 120B.

In an example embodiment, assembly 110 includes actuator 128. To transition from the disconnect mode to the connect mode: actuator 128 is arranged to displace slider ring 120 in axial direction AD2, slider ring 120 is arranged to slide across arm 114 in direction AD2, slider ring 120 is arranged to pivot arm 114 in rotational direction RD1, arm 114 is arranged to displace hub 102, with respect to wedge plate 106 and shaft 108, in direction AD2, and, as further described below, hub 102 is arranged to displace wedge plate 106 radially outward. Once in the connect mode, assembly 110 is self-locking, without the use of actuator 128, as further described below.

Slider ring 120 is radially fixed with respect to axis of rotation AR and arm 114. That is, distance 130 from axis of rotation AR to slider ring 120 is fixed. Thus, in the connect mode, since slider ring 120 is radially fixed, arm 114 cannot rotate in rotational direction RD2 to transition out of the connect mode. In an example embodiment, slider ring 120 is continuous in a circumferential direction. In an example embodiment, at least two portions of slider ring 120 are separated by 180 degrees about axis AR as shown in FIG. 2 and slider ring 120 is not necessarily continuous in the circumferential direction. In an example embodiment, in the connect mode, engagement arm 114 is parallel to axis of rotation AR.

In an example embodiment, shaft 108 includes axial stop 132. Axial stop 132 blocks axial displacement of support block 122 in axial direction AD1. Force F1, for example, created by torque applied to hub 102, results in force F2, due to contact between tapered surface 133 of wedge plate 106 and sloped surface 134 of hub 102, which urges hub 102 in direction AD1. However, since arm 114 and block 122 are axially displaced between and in contact with hub 102 and stop 132, block 122 and arm 114 cannot displace further in direction AD1, with respect to shaft 108 and plate 106, preventing wedge clutch 100 from transitioning to the disconnect mode. Thus, contact between arm 114 and slider ring 120 and contact between hubs 102 and 108 and assembly 110 keeps arm 114 in the position shown in FIGS. 2 and 3, without the use of actuator 128. That is, once clutch 100 is in the connect mode, actuator 128 can be de-energized. In an example embodiment, snap ring 136 engages shaft 108 to axially restrain element 112 in axial direction AD2.

Figure 5:
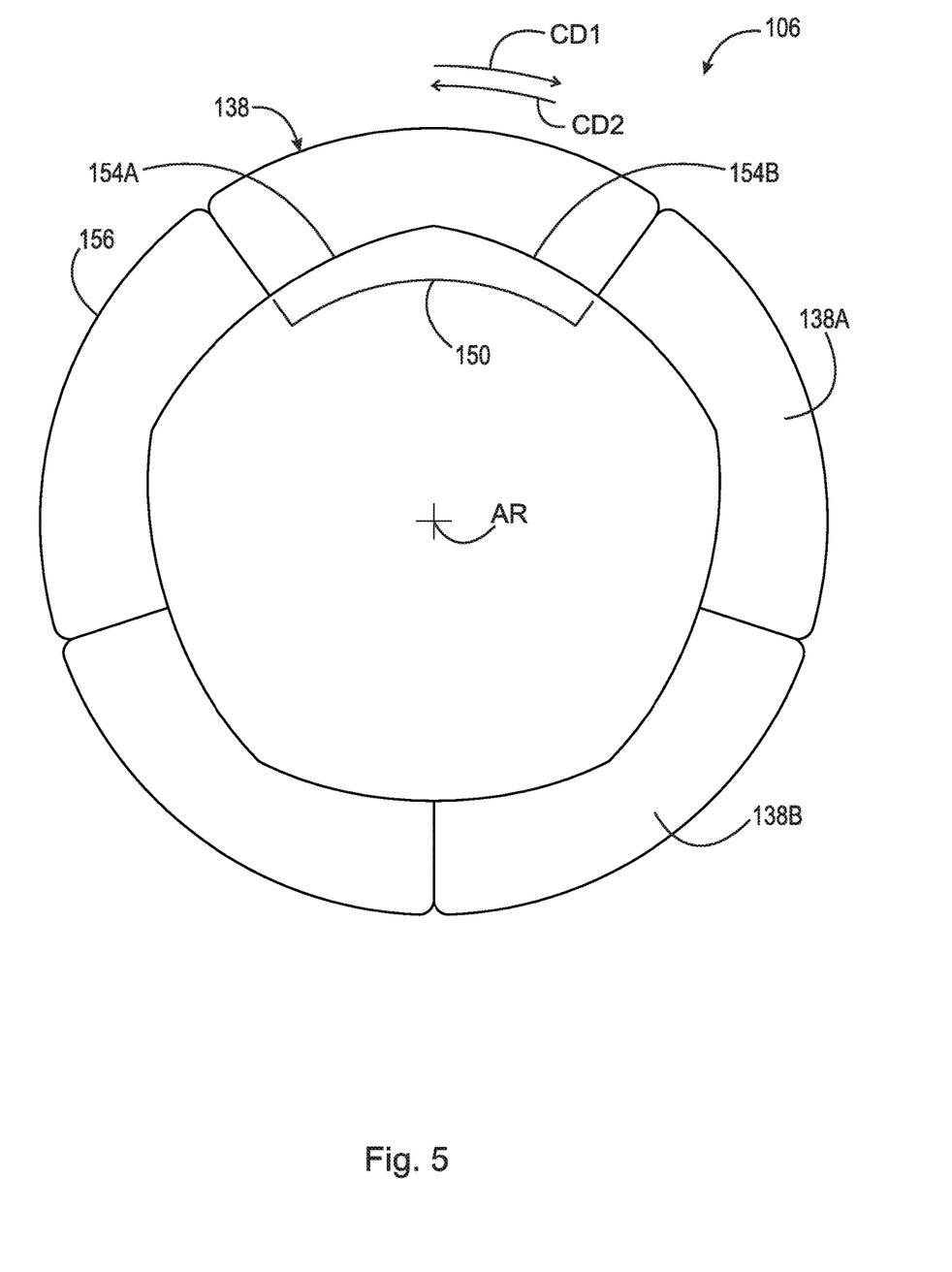
FIG. 5 is a front view of the wedge plate in FIG. 2, in isolation.

FIG. 5 is a front view of wedge plate 106 in FIG. 2.

Figure 6:
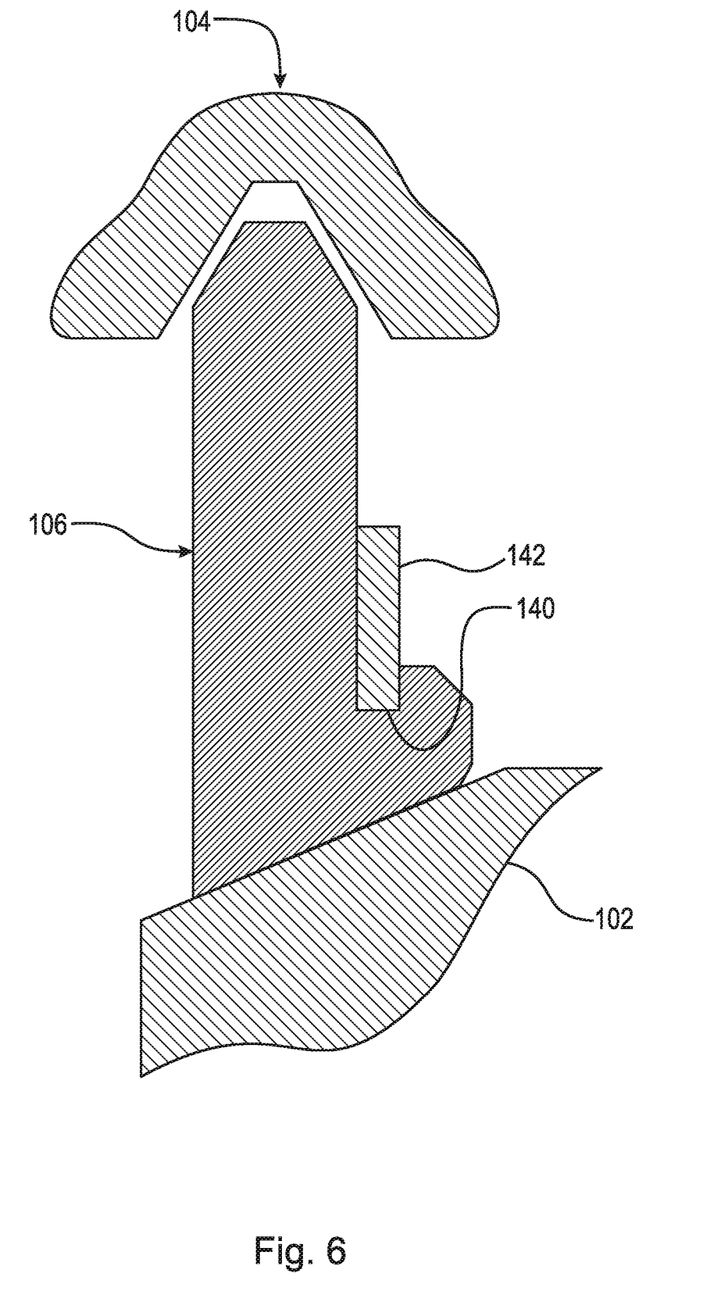
FIG. 6 is a cross-sectional view of an example embodiment of a wedge plate for the wedge clutch in FIG. 2.

FIG. 6 is a cross-sectional view of an example embodiment of a wedge plate for the wedge clutch in FIG. 2. The following should be viewed in light of FIGS. 2 through 6. In an example embodiment, wedge plate 106 includes segments 138. Each segment 138 is separately formed from the remaining segments 138. That is, each segment 138 is a separate distinct piece. Each segment 138 includes circumferentially extending groove 140, and wedge clutch 100 includes annular resilient element (ring) 142 disposed in grooves 140 and urging segments 138 radially inward into contact hub 102. In an example embodiment: each segment 138 includes a respective circumferentially extending groove 140, and wedge clutch 100 includes annular resilient element (ring) 146 disposed in grooves 140 to urge segments 138 radially inward into contact with hub 102.

Segments 138 include circumferentially adjacent segments, for example, segments 138A and 138B. For example, to transition from the disconnect mode to the connect mode: segments 138A and 138B are arranged to displace radially outward and away from each other in direction CD1 or CD2. For example, to transition from the connect mode to the disconnect mode: segments 138A and 138B are arranged to displace radially inward and toward each other in direction CD1 or CD2.

In an example embodiment, in the disconnect mode: at least one segment 138 is in contact with a circumferentially adjacent segment 138. In an example embodiment, in the connect mode: at least one segment 138 is free of contact with a circumferentially adjacent segment 138.

Figure 7:
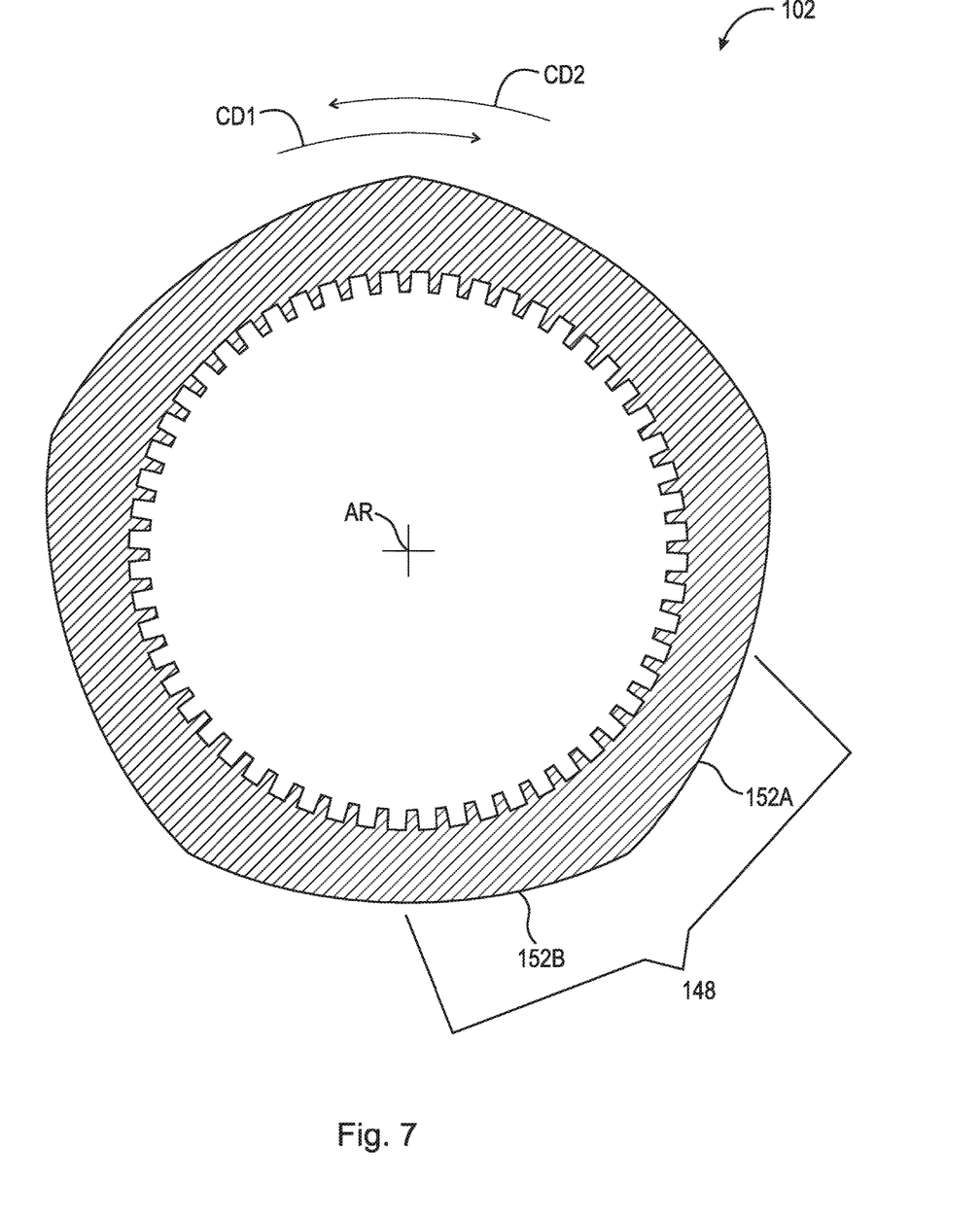
FIG. 7 is a cross-sectional view taken generally along line 7-7 in FIG. 2.

FIG. 7 is a cross-sectional view taken generally along line 7-7 in FIG. 2. The following should be viewed in light of FIGS. 2 through 7. In an example embodiment: hub 102 includes ramps, for example, ramp pairs 148, and wedge plate 106 includes ramps, for example, ramp pairs 150. Each ramp pair 148 includes ramp 152A extending radially outward in circumferential direction CD1 and ramp 152B extending radially outward in circumferential direction CD2. Each ramp pair 150 includes ramp 154A extending radially outward in circumferential direction CD1 and ramp 154B extending radially outward in circumferential direction CD2. Each ramp 152A is engaged with a respective ramp 154A. Each ramp 152B is engaged with a respective ramp 154B.

The following provides further detail regarding the structure and function of wedge clutch 100. Note that torque can be applied to either hub 102 for transmission to ring 104 or to ring 104 for transmission to hub 102. For example, to transition from the disconnect mode to the connect mode: torque is applied to hub 102 in direction CD1, actuator 128 displaces slider ring 120 in direction AD2, slider ring 120 pivots arm 114 in rotational direction RD1, and distal end 116 displaces hub 102 in axial direction AD2. As hub 102 displaces in axial direction AD2, wedge plate 106 slides radially outwardly along surface 134. Outer circumferential surfaces 156 of segments 138 frictionally engage inner circumferential surface 158 of ring 104. Hub 102 and wedge plate 106 are rotating relative to ring 104 in direction CD1. Therefore, the frictional engagement of plate 106 with ring 104 causes plate 106 to rotate with respect to hub 102, causing ramps 154A to slide radially outwardly (slide up or climb) along ramps 152A, which in turn causes wedge plate 106 to expand radially outward and non-rotatably connect to hub 102 and ring 104.

To transition from the connect mode to the disconnect mode: torque is released from hub 102, actuator 128 displaces slider ring 120 in direction AD1, spring 118 pivots arm 114 in rotational direction RD2, and element 112 displaces hub 102 in axial direction AD1. Wedge plate 106 slides down surface 134, creating gaps 160. That is, pairs 150 slide down pairs 148. Since there is no contact between wedge plate 106 and ring 104, ring 104 and hub 102 are able to rotate independently of each other.

The discussion for torque applied in direction CD1 is applicable to torque applied in direction CD2. For example, to transition from the disconnect mode to the connect mode: torque is applied to hub 102 in direction CD2, actuator 128 displaces slider ring 120 in direction AD2, slider ring 120 pivots arm 114 in rotational direction RD1, and distal end 116 displaces hub 102 in axial direction AD2. As hub 102 displaces in direction AD2, wedge plate 106 slides radially outwardly along surface 134. Outer circumferential surfaces 156 of segments 138 frictionally engage inner circumferential surface 158 of ring 104. Hub 102 and wedge plate 106 are rotating relative to ring 104 in direction CD2. Therefore, the frictional engagement of plate 106 with ring 104 causes plate 106 to rotate with respect to hub 102, causing ramps 154B to slide radially outwardly (slide up or climb) along ramps 152B, which in turn causes wedge plate 106 to expand radially outward and non-rotatably connect to hub 102 and ring 104.

To transition from the connect mode to the disconnect mode: torque is released from hub 102, actuator 128 displaces slider ring 120 in direction AD1, spring 118 pivots arm 114 in rotational direction RD2, and element 112 displaces hub 102 in axial direction AD1. Wedge plate 106 slides down surface 134, creating gaps 160 between surfaces 156 and 158. That is, pairs 150 slide down pairs 148. Since there is no contact between wedge plate 106 and ring 104, ring 104 and hub 102 are able to rotate independently of each other.

Note that the above discussion regarding application of torque to hub 102 is applicable to application of torque to ring 104.

In an example embodiment, wedge clutch 100 includes a plurality of arms 114, for example, as shown in FIG. 2. It should be understood that clutch 100 is not limited to any particular number of arms 114 or any particular circumferential configuration of arms 114. Multiple arms 114 stabilize slider ring 120 during the connect mode, since the radially outward force applied by multiple arms 114 on slider ring 120 cancel each other.

Figure 8A:
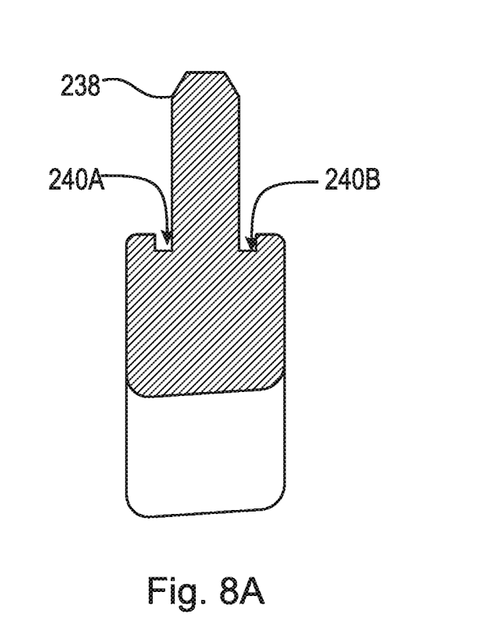
FIG. 8A is a partial cross-sectional view of an example embodiment of a wedge plate for the wedge clutch in FIG. 2, in isolation.

FIG. 8A is a partial cross-sectional view of an example embodiment of a wedge plate for the wedge clutch in FIG. 2, in isolation. In other words, the inner and outer hubs are not illustrated. The discussion above pertaining to wedge plate 106 including segments 138 applies to wedge plate segments 238 except as noted below. Each segment 238 includes circumferentially extending grooves 240A and 240B. Grooves 240A and 240B are arranged to receive annular resilient elements, or rings, which urge segments 238 radially inward into contact with an inner hub. Groove 240A is radially aligned relative to groove 240B. In an example embodiment, grooves 240A and 240B are arranged closer to the inner hub or farther away from the inner hub. Clutch 100 is not limited to the particular arrangement of grooves 240A and 240B.

Figure 8B:
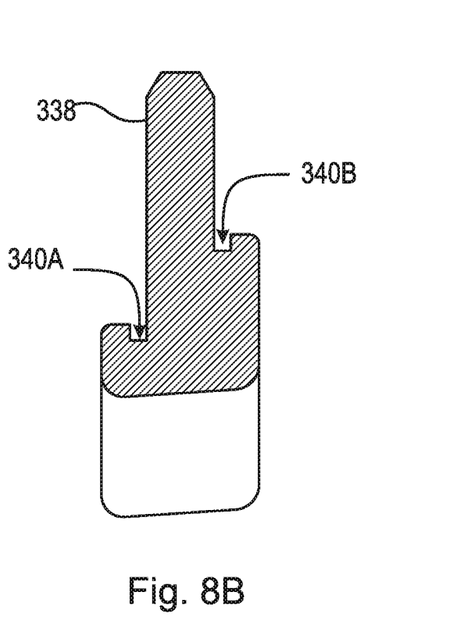
FIG. 8B is a partial cross-sectional view of an example embodiment of a wedge plate for the wedge clutch in FIG. 2, in isolation.

FIG. 8B is a partial cross-sectional view of an example embodiment of a wedge plate for the wedge clutch in FIG. 2, in isolation. The discussion above pertaining to wedge plate 106 including segments 138 applies to wedge plate segment 338 except as noted below. Each segment 338 includes circumferentially extending grooves 340A and 340B. Grooves 340A and 340B are arranged to receive annular resilient elements, or rings, which urge segments 338 radially inward into contact with an inner hub. Groove 340A is radially offset relative to groove 340B. Clutch 100 is not limited to the radially offset grooves shown in FIG. 8B, for example, groove 340A can be arranged radially outward relative to groove 340B. Grooves 340A and 340B can be arranged closer to or farther away from the inner hub.

Figure 8C:
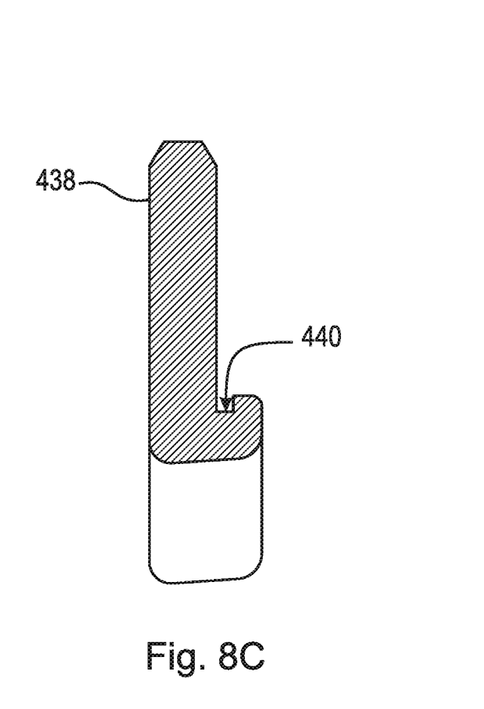
FIG. 8C is a partial cross-sectional view of an example embodiment of a wedge plate for the wedge clutch in FIG. 2, in isolation; and, FIG. 8D is a partial cross-sectional view of an example embodiment of a wedge plate for the wedge clutch in FIG. 2, in isolation.

FIG. 8C is a partial cross-sectional view of an example embodiment of a wedge plate for the wedge clutch in FIG. 2, in isolation. The discussion above pertaining to wedge plate 106 including segments 138 applies to wedge plate segment 438 except as noted below. Each segment 438 includes circumferentially extending groove 440. Groove 440 is arranged to receive an annular resilient element, or ring, which urges segment 438 radially inward into contact with an inner hub. Groove 440 can be arranged farther away from the inner hub in an example embodiment.

Figure 8D:
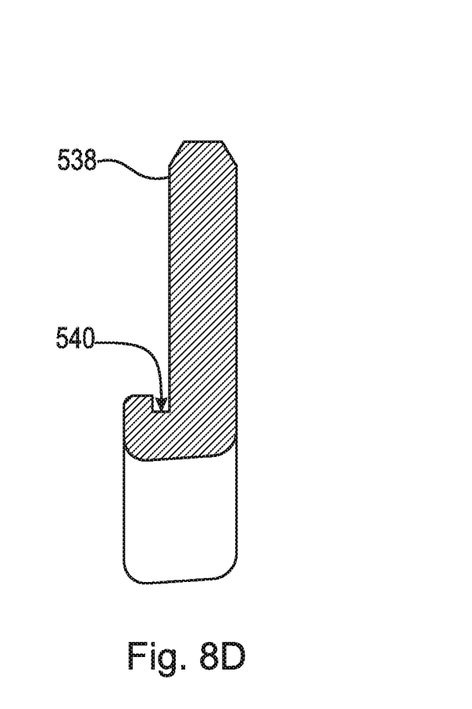

FIG. 8D is a partial cross-sectional view of an example embodiment of a wedge plate for the wedge clutch in FIG. 2, in isolation. The discussion above pertaining to wedge plate 106 including segments 138 applies to wedge plate segment 538 except as noted below. Each segment 538 includes circumferentially extending groove 540. Groove 540 is arranged to receive an annular resilient element, or ring, which urges segment 538 radially inward into contact with an inner hub. Groove 540 can be arranged farther away from the inner hub in an example embodiment.

Advantageously, wedge clutch 100 resolves the problem noted above of preventing a wedge clutch from slipping from a connect mode to a disconnect mode or of preventing a wedge clutch from slipping in the connect mode to reduce the torque-carrying capacity of the clutch. In particular, the axial and radial disposition of slider ring 120 with respect to arm 114 and the axially positioning of arm 114 and block 122 between hub 102 and stop 132, hold arm 114 in place for the connect mode without the use of force from actuator 128. Thus, in the connect mode, actuator 128 can be deactivated once slider ring 120 has fully pivoted arm 114 in direction RD2. Therefore, hub 102 is prevented from displacing in direction AD1 in the connect mode, which eliminates undesired opening of clutch 100 and loss of torque-carrying capacity for clutch 100.

Advantageously, wedge plate 106 including segments 138, 238, 338, 438 and 538 can radially expand outward evenly and achieve a conforming locking force to engage an all-wheel-drive system. Segments 138, 238, 338, 438 and 538 are retained radially and axially by one or more retaining rings which serves as a spring to allow the radial expansion and a damper to reduce rattle and noise. Due to the arrangement of wedge plate 106 and since segments 138, 238, 338, 438 and 538 are not required to flex, the assembly provides maximal contact to lock the wedge plate to the outer ring. The maximal contact provides greater locking force capability over typical wedge clutch assemblies. Additional material is not required to provide the maximal contact and locking force capability. Since segments 138, 238, 338, 438 and 538 do not constantly flex, they are not vulnerable to fatiguing. Wedge plate 106 including segments 138, 238, 338, 438 and 538 can be used with clutch 100 or any other suitable alternative clutch.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A wedge plate for a wedge clutch assembly for selectively engaging or disengaging an inner hub and an outer ring, comprising:
    first wedge plate segments arranged radially between the inner hub and outer ring, each of the first wedge plate segments including a first circumferentially extending groove; and,
    a first retaining element disposed in the first circumferentially extending groove and urging a tapered surface of the first wedge plate segments radially inward against a tapered surface of the inner hub.

2. The wedge plate of claim 1, further comprising:
    a second circumferentially extending groove in each of the first wedge plate segments; and,
    a second retaining element disposed in the second circumferentially extending groove and urging the first wedge plate segments radially inward to contact the inner hub.

3. The wedge plate of claim 2, wherein the second circumferentially extending groove is positioned radially offset relative to the first circumferentially extending groove.

4. The wedge plate of claim 2, wherein the second circumferentially extending groove is positioned radially aligned relative to the first circumferentially extending groove.

5. The wedge plate of claim 1, wherein the first wedge plate segments include first and second circumferentially adjacent segments arranged to be displaced radially outward and away from each other circumferentially to transition from a disconnect mode to a connect mode.

6. The wedge plate of claim 1, wherein the first wedge plate segments include first and second circumferentially adjacent segments arranged to be displaced radially inward and toward each other circumferentially to transition from a connect mode to a disconnect mode.

7. The wedge plate of claim 1, wherein the first wedge plate segments include first and second circumferentially adjacent segments which contact each other in a disconnect mode.

8. The wedge plate of claim 1, wherein the first wedge plate segments include first and second circumferentially adjacent segments which do not contact each other in a connect mode.

9. The wedge plate of claim 1, wherein each of the first wedge plate segments is separately formed from remaining segments.

10. A wedge clutch assembly for selectively engaging or disengaging an inner hub and an outer ring, comprising:
   first wedge plate segments arranged radially between the inner hub and outer ring, each of the first wedge plate segments including a tapered surface, a first plurality of ramps and a first circumferentially extending groove;
   a first retaining element disposed in the first circumferentially extending groove and urging the tapered surface radially to contact the inner hub; and,
   a second plurality of ramps arranged on the inner hub and engaged with the first plurality of ramps.

11. The wedge clutch assembly of claim 10, wherein the first plurality of ramps are arranged to slide radially along the second plurality of ramps in a first circumferential direction to transition from a disconnect mode to a connect mode.

12. The wedge clutch assembly of claim 11, wherein the inner hub is axially displaceable by an actuator to implement a disconnect mode or a connect mode.

13. The wedge clutch assembly of claim 10, wherein each of the first wedge plate segments includes a second circumferentially extending groove and a second retaining element disposed in the second circumferentially extending groove.

14. The wedge clutch assembly of claim 13, wherein the second circumferentially extending groove is positioned radially offset relative to the first circumferentially extending groove.

15. The wedge clutch assembly of claim 13, wherein the second circumferentially extending groove is positioned radially aligned relative to the first circumferentially extending groove.

16. The wedge clutch assembly of claim 10, wherein the first wedge plate segments include first and second circumferentially adjacent segments which contact each other in a disconnect mode.

17. The wedge clutch assembly of claim 10, wherein the first wedge plate segments include first and second circumferentially adjacent segments which do not contact each other in a connect mode.

18. The wedge clutch assembly of claim 10, wherein each of the first wedge plate segments is separately formed from remaining segments.

19. A wedge clutch comprising:
   a tapered hub having a first plurality of ramps;
   a ring;
   a plurality of wedge plate segments arranged radially between the tapered hub and the ring, each of the wedge plate segments including a tapered surface, a ramp in contact with one of the first plurality of ramps, and a circumferentially extending groove; and
   a retaining element disposed in the circumferentially extending groove and urging the tapered surfaces of the wedge plates radially to contact the tapered hub; and
   an actuator configured to axially displace the tapered hub to rotationally connect and disconnect the tapered hub and the ring.

* * * * *